(12) United States Patent
Schwartz et al.

(10) Patent No.: US 9,323,780 B2
(45) Date of Patent: Apr. 26, 2016

(54) LOCALE-BASED SORTING ON MOBILE DEVICES

(71) Applicant: Microsoft Technology Licensing, LLC, Redmond, WA (US)

(72) Inventors: David Schwartz, Kirkland, WA (US); Patrick Tousignant, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 321 days.

(21) Appl. No.: 13/890,455

(22) Filed: May 9, 2013

(65) Prior Publication Data

US 2014/0280244 A1    Sep. 18, 2014

Related U.S. Application Data

(60) Provisional application No. 61/779,654, filed on Mar. 13, 2013.

(51) Int. Cl.
*G06F 17/30* (2006.01)
*H04L 12/58* (2006.01)

(52) U.S. Cl.
CPC .......... *G06F 17/30241* (2013.01); *H04L 51/28* (2013.01)

(58) Field of Classification Search
USPC ........................................................ 707/752
See application file for complete search history.

(56) References Cited

U.S. PATENT DOCUMENTS

| | | | |
|---|---|---|---|
| 6,947,976 B1 | 9/2005 | Devitt et al. | |
| 7,634,463 B1 | 12/2009 | Katragadda et al. | |
| 8,478,837 B2 * | 7/2013 | Ollis et al. | 709/217 |
| 8,798,596 B2 * | 8/2014 | Shuster et al. | H04W 4/023 |
| | | | 379/201.01 |
| 8,805,417 B2 * | 8/2014 | Angiolillo | 455/456.3 |
| 9,035,884 B2 * | 5/2015 | Phillips et al. | G06F 17/289 |
| | | | 341/22 |
| 2002/0016857 A1 * | 2/2002 | Harari | 709/238 |
| 2002/0103908 A1 | 8/2002 | Rouse et al. | |
| 2002/0147717 A1 | 10/2002 | Barros et al. | |
| 2007/0150444 A1 | 6/2007 | Chesnais et al. | |

(Continued)

FOREIGN PATENT DOCUMENTS

WO    2011100113 A2    8/2011

OTHER PUBLICATIONS

"Setting Up Servers to Support Offline Address Books", Published on: Mar. 20, 2006, Available at: http://technet.microsoft.com/en-us/library/bb124041(v=exchg.65).aspx.

(Continued)

*Primary Examiner* — Debbie Le
(74) *Attorney, Agent, or Firm* — Damon Rieth; Leonard Smith; Micky Minhas

(57) ABSTRACT

Embodiments are directed to implementing locale-based sorting and to creating temporary metadata sorting values. In one scenario, a computer system sends a request for a contact list, where the request includes an indication of the user's locale. The contact list includes contact information for contacts of a specified user. The computer system receives the requested contact list, which includes various portions of appended, locale-specific sorting metadata for at least one of the user's contacts' fields. The computer system then sorts the contacts of the contact list according to the selected sorting criterion using the sorting metadata, where the sorting metadata includes a sorting order specific to the user's locale. After the contacts are sorted, the computer system presents the sorted contacts to the user in a user interface.

20 Claims, 5 Drawing Sheets

(56) References Cited

U.S. PATENT DOCUMENTS

| | | |
|---|---|---|
| 2008/0205655 A1 | 8/2008 | Wilkins et al. |
| 2010/0093365 A1 | 4/2010 | Bloebaum |
| 2010/0241638 A1 | 9/2010 | O'sullivan et al. |
| 2010/0330972 A1* | 12/2010 | Angiolillo .................... 455/418 |
| 2011/0092227 A1 | 4/2011 | Phukan |
| 2011/0231407 A1* | 9/2011 | Gupta et al. ................ 707/748 |
| 2012/0004015 A1* | 1/2012 | Le Thierry D'Ennequin ............... 455/566 |
| 2012/0158751 A1 | 6/2012 | Tseng |
| 2012/0296984 A1 | 11/2012 | Khan |
| 2014/0052742 A1* | 2/2014 | Deng et al. .................... 707/752 |
| 2014/0215330 A1* | 7/2014 | Lee .................... G06F 17/3087 715/703 |

OTHER PUBLICATIONS

"International Search Report and Written Opinion Received for Patent Application No. PCT/US2014/021047", Mailed Date: Sep. 30, 2014, 11 Pages.

* cited by examiner

LOCALE-BASED SORTING ON MOBILE DEVICES

CROSS-REFERENCE TO RELATED APPLICATIONS

This application claims priority to and the benefit of U.S. Provisional Application Ser. No. 61/779,654, filed on Mar. 13, 2013, entitled "Locale-Based Sorting on Mobile Devices", which application is incorporated by reference herein in its entirety.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or personal information management programs for managing email, contacts and calendar.

Typically, personal information management programs are configured to support sorting contacts, emails or other items within the program. These items are usually sorted based on various user-selected criteria. The items are often sorted based on Unicode code pages. While such sorting may work for English language users, it may not be acceptable for foreign language users, as other languages may have different rules for sorting words. For example, in Danish "Aa" is considered a single letter, and in Dutch, "ij" sorts after the "y" and not between "ih" and "ik". Such sorting may be further complicated when the personal information management program is run as an offline we application.

BRIEF SUMMARY

Embodiments described herein are directed to implementing locale-based sorting and to creating temporary metadata sorting values. In one embodiment, a computer system sends a request for a contact list, where the request includes an indication of the user's locale. The contact list includes contact information for contacts of a specified user. The computer system receives the requested contact list, which includes various portions of appended, locale-specific sorting metadata for at least one of the user's contacts' fields. The computer system then sorts the contacts of the contact list according to the selected sorting criterion using the sorting metadata, where the sorting metadata includes a sorting order specific to the user's locale. After the contacts are sorted, the computer system presents the sorted contacts to the user in a user interface.

In another embodiment, a computer system receives a request for a contact list from a user. The computer system accesses at least one of the user's contacts in the contact list, determines the user's current locale, and generates sorting metadata for at least one of the user's contacts based on the determined locale. The sorting metadata includes locale-specific metadata for each contact, and for different sets of sorting criteria. The computer system also sends the contact list with the generated sorting metadata to the user, so that the user sorts the contacts of the contact list according to the selected sorting criterion using the sorting metadata.

In yet another embodiment, a mobile computing device that is in offline mode receives, from a user, a request to add a new contact to the user's contact list. The mobile computing device uses a sorting function to sort to multiple neighboring contacts, which are those contacts between which the new contact is to be placed. The mobile computing device then creates a temporary metadata value for the new contact based on contact data for each of the neighboring contacts and sorts the contacts in the contact list including the new contact using the temporary metadata value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
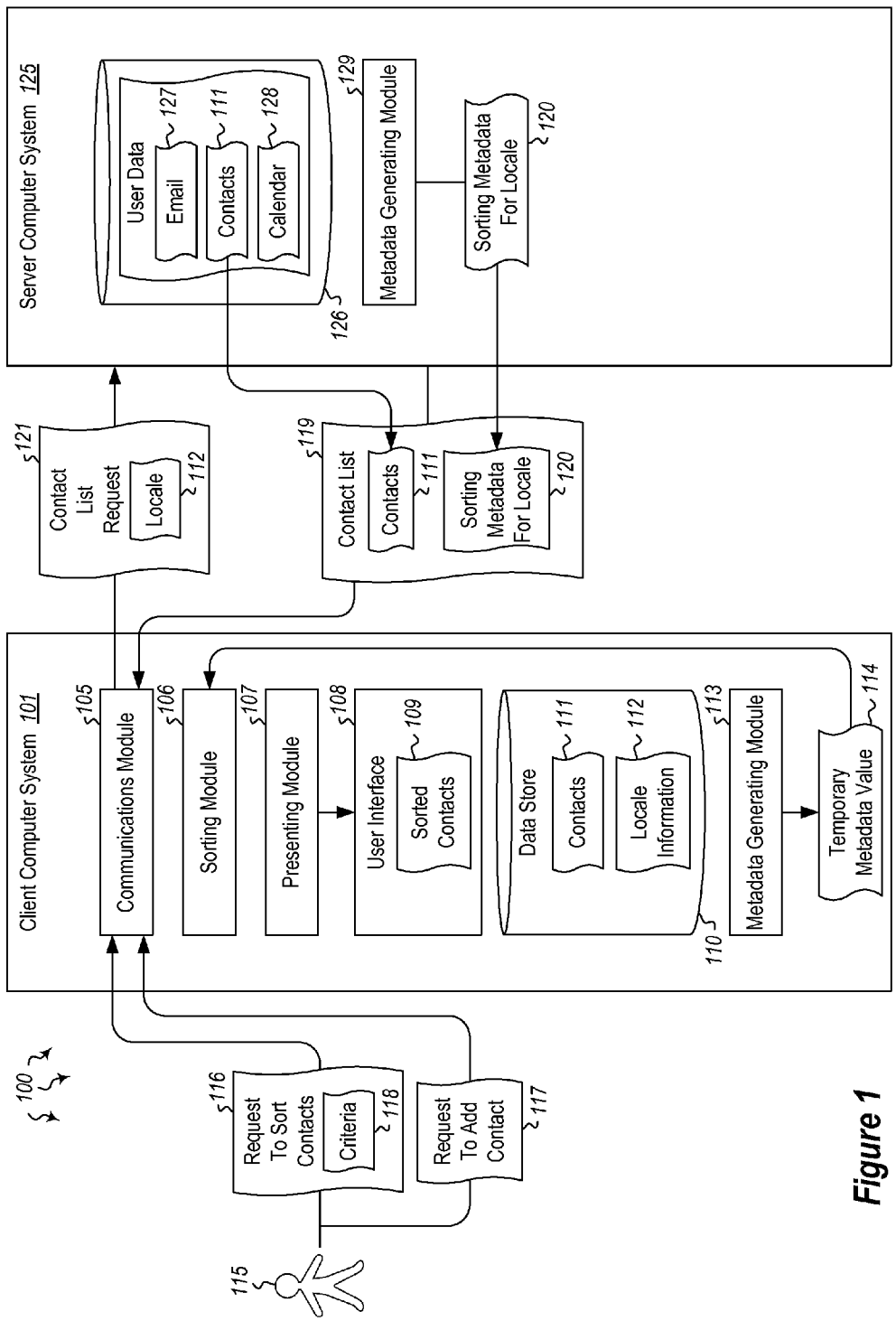
FIG. 1 illustrates a computer architecture in which embodiments described herein may operate including implementing locale-based sorting.

Embodiments described herein are directed to implementing locale-based sorting and to creating temporary metadata sorting values. In one embodiment, a computer system sends a request for a contact list, where the request includes an indication of the user's locale. The contact list includes contact information for contacts of a specified user. The computer system receives the requested contact list, which includes various portions of appended, locale-specific sorting metadata for at least one of the user's contacts' fields. The computer system then sorts the contacts of the contact list according to the selected sorting criterion using the sorting metadata, where the sorting metadata includes a sorting order specific to the user's locale. After the contacts are sorted, the computer system presents the sorted contacts to the user in a user interface.

In another embodiment, a computer system receives a request for a contact list from a user. The computer system accesses at least one of the user's contacts in the contact list, determines the user's current locale, and generates sorting metadata for at least one of the user's contacts based on the determined locale. The sorting metadata includes locale-specific metadata for each contact, and for different sets of sorting criteria. The computer system also sends the contact list with the generated sorting metadata to the user, so that the user sorts the contacts of the contact list according to the selected sorting criterion using the sorting metadata.

In yet another embodiment, a mobile computing device that is in offline mode receives, from a user, a request to add a new contact to the user's contact list. The mobile computing device uses a sorting function to sort to multiple neighboring contacts, which are those contacts between which the new contact is to be placed. The mobile computing device then creates a temporary metadata value for the new contact based on contact data for each of the neighboring contacts and sorts the contacts in the contact list including the new contact using the temporary metadata value.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes client computer system 101. Client computer system 101 may be any type of local or distributed computer system, including a cloud computing system. The computer system includes various modules for performing a variety of different functions. For instance, the communications module 105 may receive communications from user 115 (such as a request to sort contacts 116 or a request to add a contact 117) and may send and receive communications from server computer system 125. (As with the client computer system 101, the server computer system 125 may be any type of local or distributed computer system.) For example, the communications module 105 may send a contact list request 121 to the server, and receive a contact list 119 in return. The client list may include any or all of the user's contacts 111, along with other associated user data 126 including email 127 and calendar information 128.

In some cases, the client computer system 101 may be configured to run a personal management web application. The personal management web application allows the user 115 to access his or her email, contacts and calendar information through a web browser (e.g. user interface 108). In some cases, the personal management web application may be used in an offline or disconnected mode where the web application is not connected to the internet. In such scenarios, the user 117 may desire to sort his or her contacts based on a certain criterion 118 (e.g. last name). As such, any requests for a contact list from the server (while online) will include the user's locale 112. The server can append locale-specific sorting metadata 120 to the contact list, which can be used to sort the user's contacts in a local-specific manner, while the user's device is offline.

Thus, the user may send a request 121 (at some point while online) to receive a contact list from the server 125. The contact list 119 sent to the client computer system 101 includes the user's contacts 111 and some locale-specific metadata 120. The locale-specific metadata allows the sorting module 106 to sort contacts 111 even when the web application is in offline mode. Accordingly, when using the web application in offline mode, the user may request that his or her contacts be sorted according to a criterion (e.g. last name). The sorting module 106 accesses the contacts 111 from the local data store 110 and sorts the contacts according to last name using the locale-specific metadata. The contacts may be sorted by substantially any set of criteria 118, including (but not limited to) sorting by field type, first name, last name, company name, city (address location), and creation date. The contacts may be sorted in either ascending or descending sort order. The sorted contacts 109 may be prepared for presentation to the user by presentation module 107. The prepared, sorted contacts are then presented in user interface 108. Other embodiments include creating sorting metadata and, in some cases, creating temporary sorting metadata for newly added contacts. These concepts will each be explained further below with regard to methods 200, 300 and 400 of FIGS. 2, 3 and 4, respectively.

Figure 2:
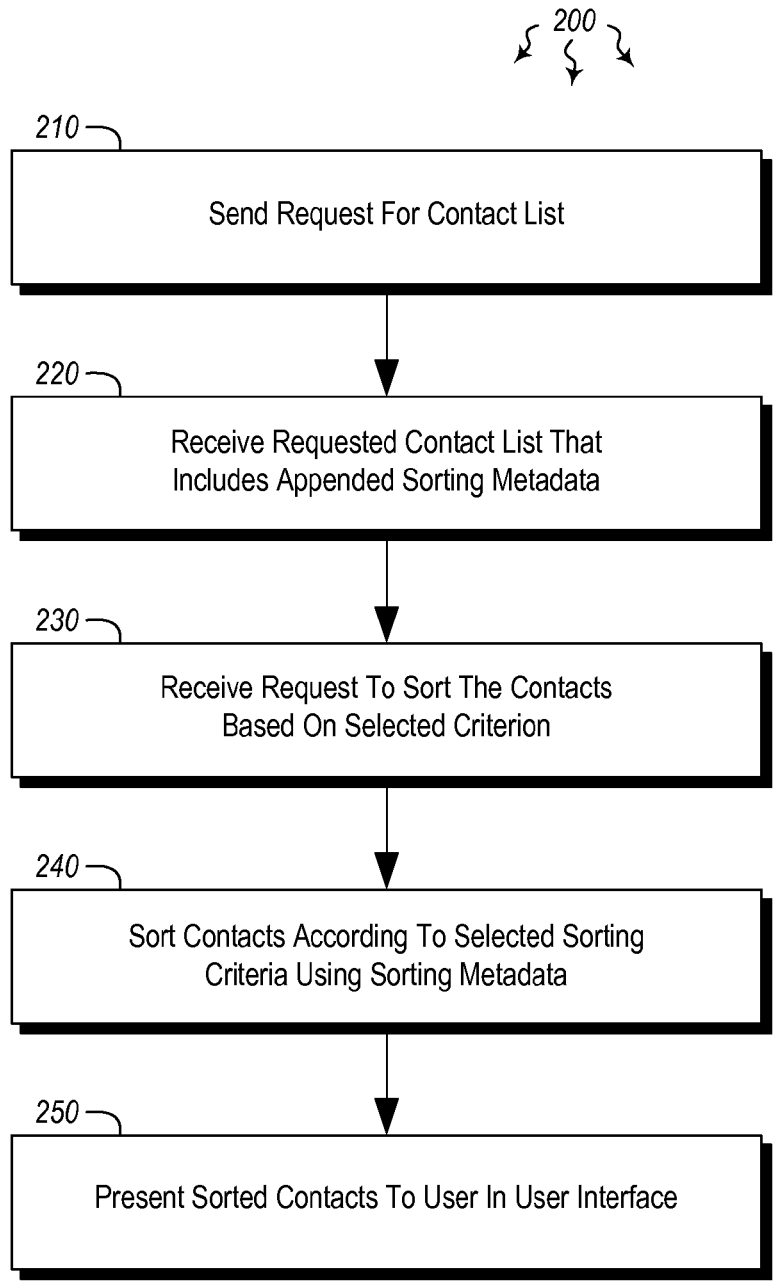
FIG. 2 illustrates a flowchart of an example method for implementing locale-based sorting.
Figure 3:
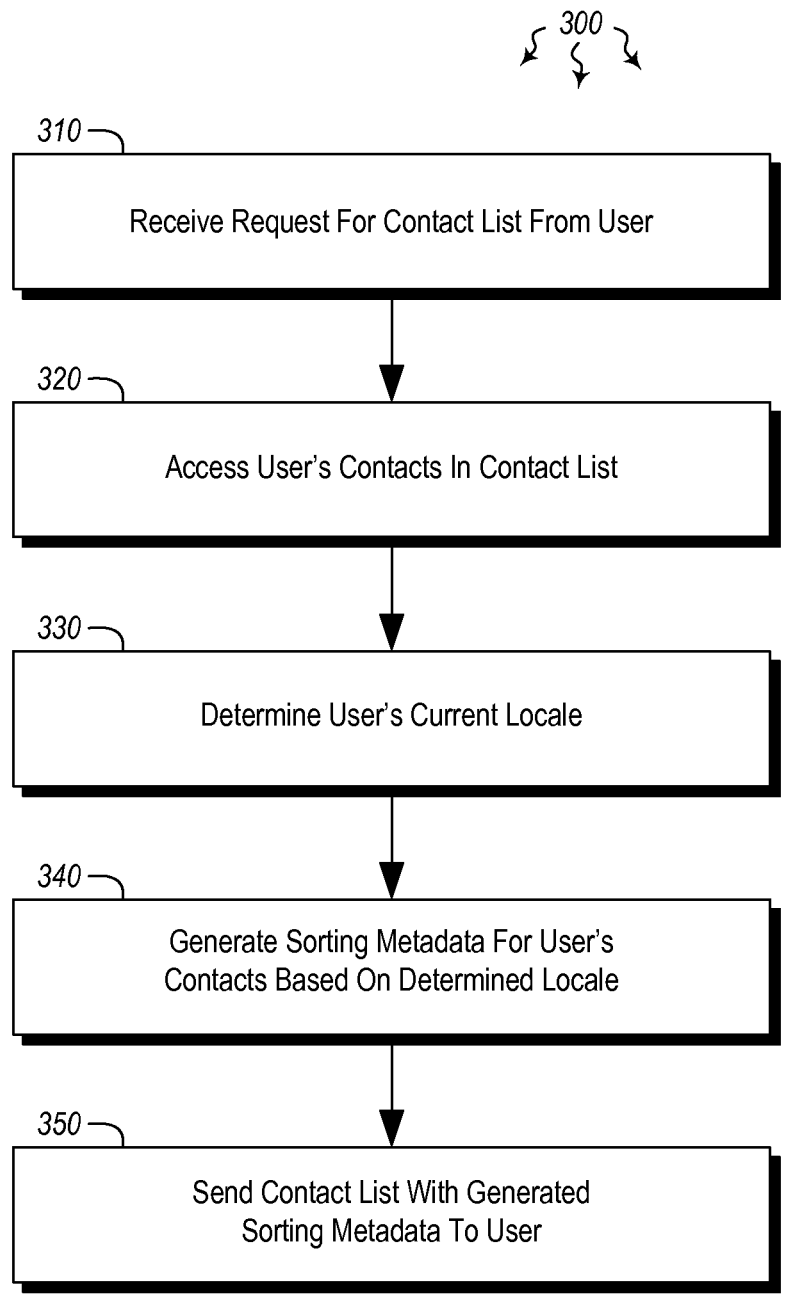
FIG. 3 illustrates a flowchart of an alternative example method for implementing locale-based sorting.
Figure 4:
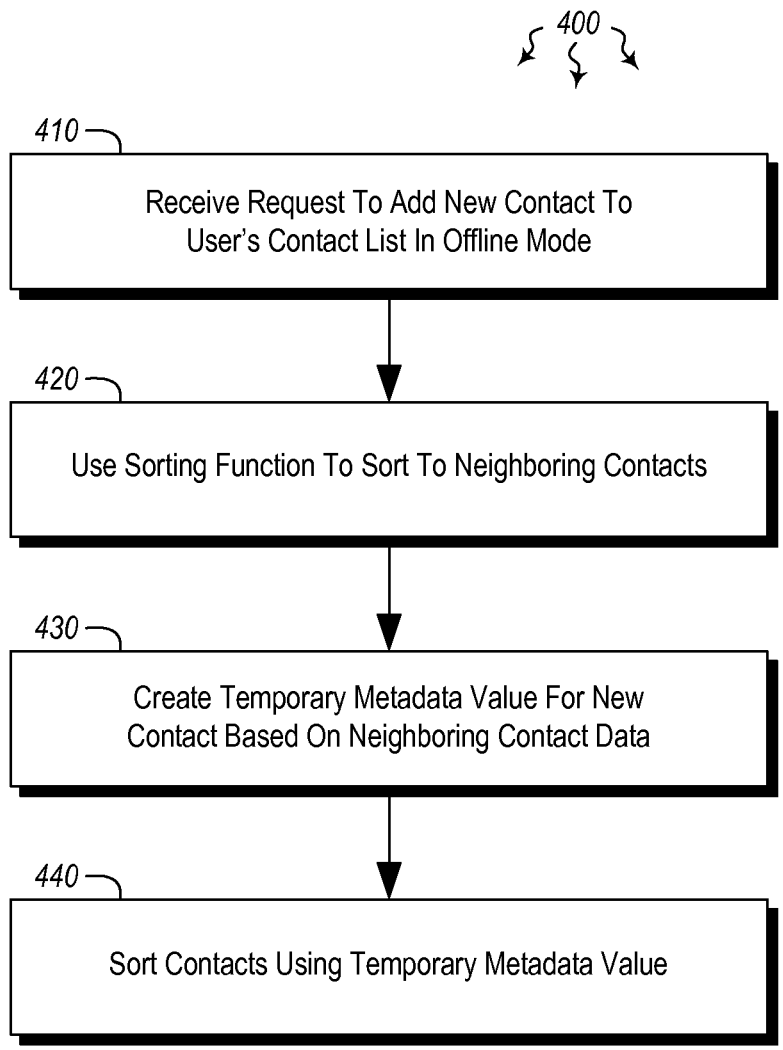
FIG. 4 illustrates a flowchart of an example method for creating a temporary metadata sorting value.

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for implementing locale-based sorting. The method 200 will now be described with frequent reference to the components and data of environment 100 of FIG. 1, as well as the embodiments shown in FIGS. 5A and 5B.

Method 200 includes an act of sending a request for a contact list, the request including an indication of the user's locale, the contact list including contact information for one or more contacts of a specified user (act 210), an act of receiving the requested contact list, the received contact list including one or more portions of appended sorting metadata for at least one of the user's contacts' fields, the sorting metadata being specific to the user's locale (act 220), an act of receiving, from the user, a request to sort the contacts of the contact list based on a selected sorting criterion (act 230), an act of sorting the contacts of the contact list according to the selected sorting criterion using the sorting metadata, the sorting metadata including a sorting order specific to the user's locale (act 240), and an act of presenting the sorted contacts to the user in a user interface (act 250).

In some cases, the received contact list is stored in a data store. Still further, in some cases, the sorting is performed using a Unicode sort in combination with the sorting metadata. The sorting metadata 120 may be computed by the server computer system 125. This metadata may be appended to the contact list, and may not be user-facing data (i.e. the user would not see the appended metadata). The generated sort order columns in the metadata for the user's contacts 111 are used for sorting, and are generally hidden from the user. These sort order columns may include content that is sortable with standard HTML5 offline database rules (e.g. either Unicode strings or numeric indexes).

Sort indexes in the metadata may be computed at synchronization time for each item within the full dataset (i.e. the user data 126). These sort keys (i.e. sorting metadata 120) may be generated for substantially any criteria selected by the user 115. Thus, each sortable field may have a generated sort key or sort index. In order to display the data in the proper sorting order, the user's user data 126 may be resynchronized when the locale of the mailbox is determined to have changed. The locale of the user data may be stored in a user configuration object which is retrieved from the server 125 and stored in the local offline store 110 of the client computer system 101. As such, this call-store process may be used to identify locale changes.

Figure 5A:
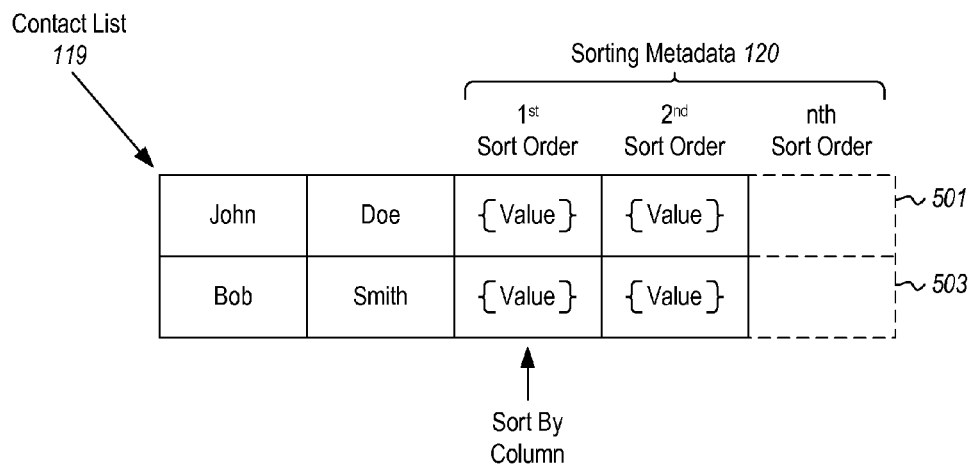
FIG. 5A illustrates an embodiment in which sorting metadata is appended to contact fields.

In some cases, sorting metadata may be generated for each of the user's contacts' fields and for each sorting criteria. For example, as shown in FIG. 5A, a contact list 119 may have multiple different contacts, including John Doe and Bob Smith. Sorting metadata 120 may be added for each contact. Thus, John Doe and Bob Smith each have first sort order metadata values and second sort order metadata values (501 for John and 503 for Bob). The first sort order values may be generated based on the user's first name. Thus, John Doe's first sort order metadata value is a number or other identifier that identifies the sort order for that contact for that criterion (first name in this case), in the user's locale.

Similarly, the second sort order fields may include metadata values that identify each contact's sort order based on last name. Substantially any number of criteria may be used, and, as such, substantially any number of fields or columns of fields may be added to the contact list 119 as sorting metadata 120. Then, when the user wants to sort their contacts in offline mode, the sorting module 106 of FIG. 1 can use the search-criteria-specific, locale-specific metadata values to perform the sorting. Thus, in one specific example, if the user wanted to sort contacts in offline mode based on first name (e.g. using request 116), the sorting module 106 would look at the metadata values in the first sort order for each contact and sort by the values in that column. The contacts 111, including John Doe and Bob Smith, would be sorted according to first name using the sorting rules of the user's language.

After the contacts have been presented to the user in user interface 108, the user may provide an input that adds a contact 117 or makes changes to an existing contact. For example, the user may change an existing contact's email address, phone number or company website. A user may also wish to sort based on the newly added contact information. For instance, the user may wish to sort based on email addresses to find out how many of their contacts work at a given location. The next time the user is online, the user's contact list (and other data) will be synchronized, and in that synchronization request, the client computer system 101 may include an indication that new sorting metadata 120 is to be generated for the new sorting criteria, or is to be updated based on changes to the indicated criteria. This sorting metadata 120 will be passed to the computer system, along with the synchronized contact list. The sorting module 106 can then use the new sorting metadata to sort based on the new criteria.

FIG. 3 illustrates a flowchart of a method 300 for implementing locale-based sorting. The method 300 will now be described with frequent reference to the components and data of environment 100 of FIG. 1, as well as the embodiments shown in FIGS. 5A and 5B.

Method 300 includes an act of receiving a request for a contact list from a user (act 310), an act of accessing one or more of the user's contacts in the contact list (act 320), an act of determining the user's current locale (act 330), an act of generating sorting metadata for at least one of the user's contacts based on the determined locale, the sorting metadata including locale-specific metadata for each contact, and for one or more sets of sorting criteria (act 340), and an act of generating sorting metadata for at least one of the user's contacts based on the determined locale, the sorting metadata including locale-specific metadata for each contact, and for one or more sets of sorting criteria (act 350).

As indicated above, and as shown in FIG. 5A, the sorting metadata 120 may be stored as part of a data field for a contact. The sorting metadata is locale-specific and, as such, if the user's locale changes, the metadata is to be changed accordingly. Thus, for instance, if the user changed his locale from France (i.e. French language) to Denmark (i.e. Danish language), the client computer system 101 would send an indication (perhaps as part of a contact list synchronization request 121) to the server computer system 125, notifying the server of the change in locale. The metadata generating module 129 would then generate new sorting metadata for the user's contacts based on the new locale. The sorting metadata 120 would be locale-specific for the new locale (Denmark), and each set of sorting criteria would have its own column of metadata. As such, the user would be able to sort the contact in a locale-specific manner, using any of the various criteria. It should be noted that the user's current locale may be changed or updated at any time, and that changes to the locale may be determined based on information in the contact list request 121 or information in other client-server communications.

Similarly, the server computer system 125 may receive an indication that the user has added a new contact to their contact list. The server may receive this indication as part of a contact list synchronization that may occur, for example, after the web application has been used offline and has now come online. The metadata generating module 129 may generate new sorting metadata 120 for the new contact, in a locale-specific manner for each of the various sorting criteria. Still further, the metadata generating module 129 may generate new (or update existing) sorting metadata when the server computer system 125 receives an indication that one or more portions of contact information for an existing contact have been updated.

In some embodiments, the server computer system 125 may analyze any received changes to determine whether a received update is sufficiently different to trigger a sorting metadata update. For example, the server may analyze a contact information update and determine that the change only affects a contact's phone number. Because users do not often sort based on telephone number, the server may determine that updating the sorting metadata can be postponed until more substantial or more important updates are received. Any changes that are received may be stored in a (local or distributed) data store. Moreover, any changes to contact information for which sorting metadata is to be created may be batched together and applied for the next subsequent contact list synchronization, or may be applied when an update is received that is sufficiently different to trigger a sorting metadata update.

FIG. 4 illustrates a flowchart of a method 400 for creating a temporary metadata sorting value. The method 400 will now be described with frequent reference to the components and data of environment 100 of FIG. 1, as well as the embodiments shown in FIGS. 5A and 5B.

Method 400 includes an act of receiving, at the mobile computing device, a request from a user to add a new contact to the user's contact list, the mobile computing device being in offline mode (act 410), an act of using a sorting function (possibly a Unicode sorting function) to sort to a plurality of neighboring contacts, the neighboring contacts comprising contacts between which the new contact is to be placed (act 420), an act of creating a temporary metadata value for the new contact based on contact data for each of the plurality of neighboring contacts (possibly whenever a contact's information is changed) (act 430), and an act of sorting the contacts in the contact list including the new contact using the temporary metadata value (act 440).

Figure 5B:
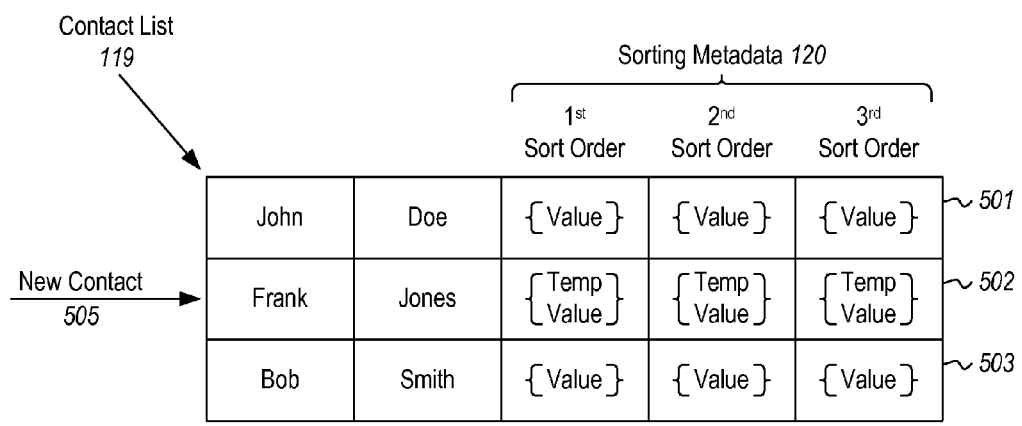
FIG. 5B illustrates an embodiment in which temporary metadata values are created for a new contact.

As shown in FIG. 5B, a new contact 505 may be added to an existing contact list 119. The new contact may be added when the web application used by the user is in offline mode. In such a mode, the web application cannot communicate with the server 125 to request locale-specific sorting metadata. As such, the client-side metadata generating module 113 may generate a temporary metadata value 114 for at least one of the different sort order columns. The new temporary values 502 may be placed in the sorting metadata 120. These temporary values may be approximations or extrapolations based on neighboring contacts' values. To determine who a neighbor is, a simple Unicode or other sorting function may be applied. Then, based on the Unicode sort, the new contact's position may be determined relative to the other contacts. After the new contact's position is determined (in this case, between John Doe and Bob Smith, when sorted based on last name), the temporary metadata value may be created and inserted into the sorting metadata fields. This temporary metadata may be created when a contact's information is changed, when a new contact is added, or based on other changes made when the web application is in offline mode. After the client computer system 101 has restored its connection to the server computer system 125, the client may notify the server that the locale-specific sorting metadata is to be updated, and may further notify the server of which contacts' information changed or was newly created. The server-side metadata generating module 129 may then generate new sorting metadata for the new contact 505 and/or for any other contact information changes. After the newly-generated replacement metadata values are received for the new/updated contacts, the temporary metadata values can be removed.

Accordingly, methods, systems and computer program products are provided which implement locale-based sorting, specifically in an offline web application scenario. Moreover, methods, systems and computer program products are provided which create temporary metadata sorting values that can be used to sort in offline mode until suitable replacements can be generated.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system comprising the following:
one or more processors;
system memory;
one or more computer-readable storage media having stored thereon computer-executable instructions that, when executed by the one or more processors, causes the computing system to perform a method for implementing local language-based sorting, the method comprising the following:
an act of sending a request for a contact list, the request including the user's current location, the contact list including contact information for one or more contacts of a specified user;
an act of receiving the requested contact list, the received contact list including one or more portions of appended sorting metadata for at least one of the user's contacts' fields, the sorting metadata being specific to the local language of the user's current location;
an act of receiving, from the user, a request to sort the contacts of the contact list based on a selected sorting criterion;
an act of sorting the contacts of the contact list according to the selected sorting criterion and, if the local language of the user's current location is different from the local language of the user's previous location, using the sorting metadata, the sorting metadata including a sorting order specific to the local language of the user's current location; and
an act of presenting the sorted contacts to the user in a user interface.

2. The computer system of claim 1, further comprising an act of storing the received contact list in a data store.

3. The computer system of claim 1, wherein the sorting is performed using a Unicode sort in combination with the sorting metadata.

4. The computer system of claim 1, wherein sorting metadata is generated for one or more of the user's contacts' fields for each of a plurality of different sorting criteria, such that the sorting metadata is specific to the sorting criterion.

5. The computer system of claim 4, wherein the sorting metadata for the selected sorting criterion is used to sort the contacts of the contact list.

6. The computer system of claim 4, wherein the sorted contacts presented in the user interface are updated based on a selection of new sorting criterion.

7. A computer system comprising the following:
one or more processors;
system memory;
one or more computer-readable storage media having stored thereon computer-executable instructions that, when executed by the one or more processors, causes the computing system to perform a method for implementing local language-based sorting, the method comprising the following:
an act of receiving a request for a contact list from a user;
an act of accessing one or more of the user's contacts in the contact list;
an act of determining the user's current location;
an act of generating sorting metadata for at least one of the user's contacts based on the user's determined current location, the sorting metadata being specific to the local language of the user's current location; and
an act of sending the contact list with the generated sorting metadata to the user, such that the user sorts the contacts of the contact list according to the selected sorting criterion using the sorting metadata.

8. The computer system of claim 7, wherein the metadata is stored as part of a data field corresponding to each contact.

9. The computer system of claim 7, further comprising:
an act of receiving an indication from the user that a new location has been selected;
an act of generating new sorting metadata for at least one of the user's contacts based on the new location, the sorting metadata including local language-specific metadata for each contact, and for one or more sets of sorting criteria; and
an act of sending the contact list with the new sorting metadata to the user, such that the user sorts the contacts of the contact list according to the selected sorting criterion using the new sorting metadata.

10. The computer system of claim 7, further comprising:
an act of receiving an indication from the user that a new contact has been added to the contact list;
an act of generating new sorting metadata for at least one of the user's contacts including the newly added contact, the sorting metadata including local language-specific metadata for each contact, and for one or more sets of sorting criteria; and
an act of sending the contact list with the new sorting metadata to the user, such that the user sorts the contacts of the contact list according to the selected sorting criterion using the new sorting metadata.

11. The computer system of claim 7, further comprising:
an act of receiving an indication from the user that contact information for an existing contact has been updated;
an act of generating new sorting metadata for at least one of the user's contacts including the contact whose contact information was updated, the sorting metadata including local language-specific metadata for each contact, and for one or more sets of sorting criteria; and
an act of sending the contact list with the new sorting metadata to the user, such that the user sorts the contacts of the contact list according to the selected sorting criterion using the new sorting metadata.

12. The computer system of claim 7, further comprising:
an act of determining whether a received update is sufficiently different to trigger a sorting metadata update.

13. The computer system of claim 12, wherein upon determining that a received update is not sufficiently different to trigger a sorting metadata update, the received update is stored in a data store.

14. The computer system of claim 13, wherein the stored update is applied upon the next received update that is sufficiently different to trigger a sorting metadata update.

15. The computer system of claim 7, wherein the user's current location is determined based on one or more portions of information in the contact list request.

16. A mobile computing device comprising the following:
one or more processors;
system memory;
one or more computer-readable storage media having stored thereon computer-executable instructions that, when executed by the one or more processors, causes the computing system to perform a method for creating a local language-based temporary metadata sorting value, the method comprising the following:
an act of receiving, at the mobile computing device, a request from a user to add a new contact to the user's contact list, the mobile computing device being in offline mode;
an act of determining the user's previous location;
an act of using a sorting function to sort to a plurality of neighboring contacts, the neighboring contacts comprising contacts between which the new contact is to be placed;
an act of creating a local language-based temporary metadata value at the user's previous location for the new contact based on contact data for each of the plurality of neighboring contacts; and
an act of sorting the contacts in the contact list including the new contact using the local language-based temporary metadata value for the user's previous location.

17. The computer system of claim 16, wherein the local language-based temporary metadata value is created when a contact's information is changed.

18. The computer system of claim 16, wherein the sorting function comprises a Unicode sorting function.

19. The computer system of claim 18, wherein the neighboring contacts are determined using the Unicode sorting function.

20. The computer system of claim 16, wherein the local language-based temporary metadata value is removed when the mobile computing device is in online mode and a replacement metadata value is received for the new contact based on the user's current location.

* * * * *